United States Patent [19]

Masui et al.

[11] Patent Number: 5,124,851

[45] Date of Patent: Jun. 23, 1992

[54] DATA RECORDING APPARATUS WITH RECORDED DATA VERIFYING MEANS

[75] Inventors: Toshiyuki Masui; Katsuji Yoshimura, both of Kanagawa; Susumu Kozuki, Tokyo, all of Japan

[73] Assignee: Canon Kabushiki Kaisha, Tokyo, Japan

[21] Appl. No.: 593,320

[22] Filed: Oct. 1, 1990

Related U.S. Application Data

[63] Continuation of Ser. No. 244,056, Sep. 13, 1988, abandoned.

[30] Foreign Application Priority Data

| Sep. 18, 1987 | [JP] | Japan | 62-235992 |
| Sep. 22, 1987 | [JP] | Japan | 62-239472 |
| Oct. 1, 1987 | [JP] | Japan | 62-249498 |
| Oct. 2, 1987 | [JP] | Japan | 62-250443 |
| Oct. 5, 1987 | [JP] | Japan | 62-252038 |
| Oct. 5, 1987 | [JP] | Japan | 62-252040 |

[51] Int. Cl.$^5$ .............................................. G11B 5/09
[52] U.S. Cl. ............................................... 360/53
[58] Field of Search ................................... 360/64, 53

[56] References Cited

U.S. PATENT DOCUMENTS

| 3,765,005 | 10/1973 | Cannon | 360/53 |
| 4,011,587 | 3/1977 | Arter et al. | 360/64 |
| 4,494,155 | 1/1985 | Veillard | 360/53 |
| 4,549,295 | 10/1985 | Purvis | 360/53 |
| 4,638,472 | 1/1987 | Ogara et al. | 360/53 |
| 4,669,002 | 5/1987 | Niskioka et al. | 360/31 |
| 4,796,105 | 1/1989 | Mawatari | 360/64 |
| 4,833,665 | 5/1989 | Tokumitsu et al. | 360/53 |

Primary Examiner—Vincent P. Canney
Attorney, Agent, or Firm—Robin, Blecker, Daley & Driscoll

[57] ABSTRACT

A data recorder comprises a first rotary head and a second rotary head which traces a tape-shaped recording medium travelling at a given speed by following recording tracks formed by the first rotary head. When an error of data reproduced from any of the recording tracks by the second rotary head is detected while data is being recorded by the first rotary head, the first rotary head is caused to record, in another track, data which is identical with the data reproduced from the above stated track depending on the data error occurring state of the track.

11 Claims, 16 Drawing Sheets

FIG. 1
PRIOR ART
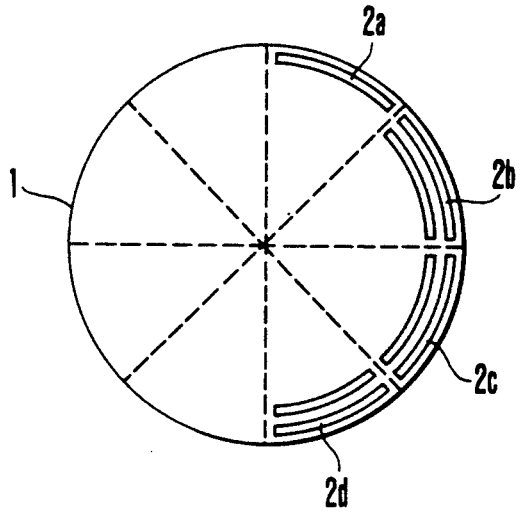
FIG. 2(a)
FIG. 2(b)
FIG. 2(c)
PRIOR ART
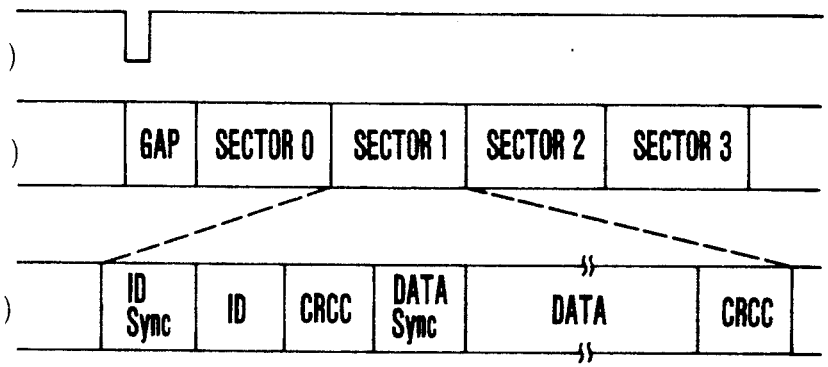
FIG. 3
PRIOR ART
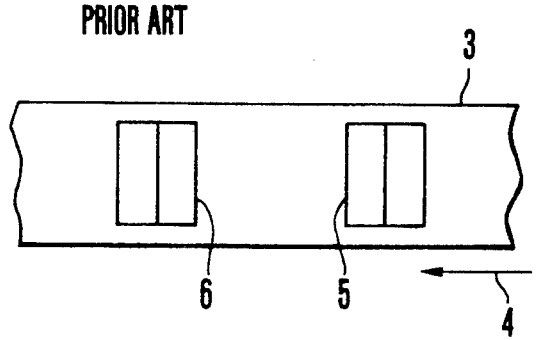

DATA RECORDING APPARATUS WITH RECORDED DATA VERIFYING MEANS

This application is a continuation of application Ser. No. 244,056, filed Sep. 13, 1988 now abandoned.

BACKGROUND OF THE INVENTION

1. Field of the Invention

This invention relates to a data recording apparatus and more particularly to a data recording apparatus having a function of verifying recorded data.

2. Description of the Related Art

There are digital data recorders of two known kinds, one using a disc-shaped recording medium such as a floppy disc and the other a tape-shaped recording medium.

In the data recorders of these kinds, a dropout in recorded data causes a serious defect. In recording data, therefore, the recorded data must be verified in order to assure the reliability of the record. The conventional data recorder is arranged to make such verification in a manner suited for a recording method, the recording medium used and other conditions.

FIG. 1 of accompanying drawings shows recording tracks formed on a recording medium by a typical conventional data recorder of the kind using a disc-shaped recording medium. FIGS. 2(a) to 2(c) show the allocation of data on the recording tracks of FIG. 1. A reference numeral 1 denotes the disc-shaped recording medium; and 2a, 2b, 2c and 2d denote recording tracks obtained in different sectors. In the data recorder of this kind, data is recorded in a plurality of sectors as shown in FIG. 2(b) in accordance with an index pulse which is as shown in FIG. 2(a). In FIG. 2(b), a reference symbol GAP denotes a part in which no data is recorded. Data is allocated within each of the sectors 0, 1, 2, 3, etc. as shown in FIG. 2(c). In FIG. 2(c), a symbol DATA denotes main data to be recorded; a symbol DATA Sync denotes data provided for the purpose of synchronizing the main data; a symbol ID denotes sub-data such as control data or the like; a symbol ID Sync denotes data provided for synchronizing the sub-data; and a symbol CRCC denotes a known cyclic code (hereinafter referred to as CRCC). The data recorder of this kind verifies recorded data as follows: Reproduction is performed immediately after recording. A data error occurring state is monitored with the CRCC which is reproduced. In cases where data errors are found to be occurring to an excessive degree, the same data is again recorded in the same phasic part of the recording medium.

Referring to FIG. 3, in the case of the data recorder of the kind using a tape-shaped recording medium, a verifying head 6 is disposed on the downstream side of a recording head 5 in the direction of arrow 4 in which the tape 3 is to be transported. The error occurring state of data recorded by the recording head 5 is monitored by means of a CRCC or a parity check code reproduced by the verifying head 6. If the data error is found to be excessively occurring, data recording is suspended by bringing the transport of the tape 3 to a stop.

In the case of the data recorder using the disc-shaped recording medium, however, the amount of data recordable on the medium is limited. The recorder of this kind is, therefore, not suitable for recording data in a great amount. Meanwhile, the data recorder using the tape-shaped recording medium inevitably has a reduction in average data transmitting bit rate, because the recording is suspended on every occasion of a data error during recording, although the data is recordable in a large amount. The recorder, therefore, requires an excessively long period of time for recording.

In the case of such data as image data that can be adequately reproduced through data interpolation, etc. without completely restoring all the recorded data, much time is wasted by the above stated suspension of recording. Besides, if the head which performs reproduction during the process of verification comes to trace a part other than an applicable recording track, a noise component would mix in the data to be mistaken for a data error even when recording is adequately performed. This tendency increases accordingly as the track width decreases.

Furthermore, during the process of reproduction, the tape is temporarily rewound to reproduce data from the same track every time a data error incapable of correction occurs. This causes an excessively long period of time also for reproduction. The long period of time required for recording and reproduction greatly degrades the utility of the data recorder. Hence, this drawback has prevented the data recorder of the kind using the tape-shaped recording medium from becoming popular.

SUMMARY OF THE INVENTION

This invention is directed to the solution of the above stated problems of the prior art.

It is therefore an object of the invention to provide a tape recorder which is capable of recording highly reliable data in a large amount without requiring a long period of time for recording.

Under this object, a data recording apparatus arranged as an embodiment of this invention comprises: a first rotary head arranged to periodically trace a tape-shaped recording medium to form oblique tracks one after another on the medium; a second rotary head arranged to trace the tape-shape recording medium following a tracing locus of the first rotary head; recording processing means arranged to convert digital data into recording data suited for recording and to supply the recording data to the first rotary head; error detecting means for detecting a code error of data reproduced by the second rotary head from an oblique track formed on the recording medium; and recording control means for controlling the recording processing means on the basis of the result of detection made by the error detecting means, the control means being arranged to perform control as to whether recording data that is identical with data recorded in a track in which data reproduced by the second rotary head is recorded is to be recorded or another recording data is to be recorded as recording data in a track to be next formed by the first rotary head.

It is another object of the invention to provide a tape recorder which is arranged to permit a great reduction in time required for reproduction so that the range of applications of the data recorder of the kind using a tape-shaped recording medium can be broadened.

Under that object, an apparatus for reproducing data from a tape-shaped recording medium, on which a given amount of data is recorded together with an error correction code in many oblique tracks formed in parallel, comprises: a rotary head arranged to periodically trace the tape-shaped recording medium and to trace the oblique tracks one after another; error correcting means for correcting a code error of data reproduced by the rotary head, on the basis of the error correction code reproduced by the rotary head; determining means for determining whether or not all of code errors of data reproduced by the rotary head from each of the oblique tracks are capable of correction by the error correcting means; detecting means for detecting that data related to one information is recorded in each of adjacent tracks; and interpolation means, operable when at least one of code errors of data reproduced by the rotary head from all of a plurality of tracks detected by the detecting means to have data related to one information recorded is incapable of correction by the error correcting means, for producing one track amount of reproduced data by using only such data that has no error among the data reproduced from the plurality of tracks.

The above and other objects and features of the invention will become apparent from the following detailed description of embodiments thereof taken in connection with the accompanying drawings.

BRIEF DESCRIPTION OF THE DRAWINGS

FIG. 1 shows recording loci formed on a recording medium by a typical conventional data recorder of the kind using a disc-shaped recording medium.

FIGS. 2(a) to 2(c) show data allocation in the recording loci of FIG. 1.

FIG. 3 shows an example of the conventional data recorder of the kind using a tape-shaped recording medium.

DETAILED DESCRIPTION OF THE PREFERRED EMBODIMENTS

Figure 4:
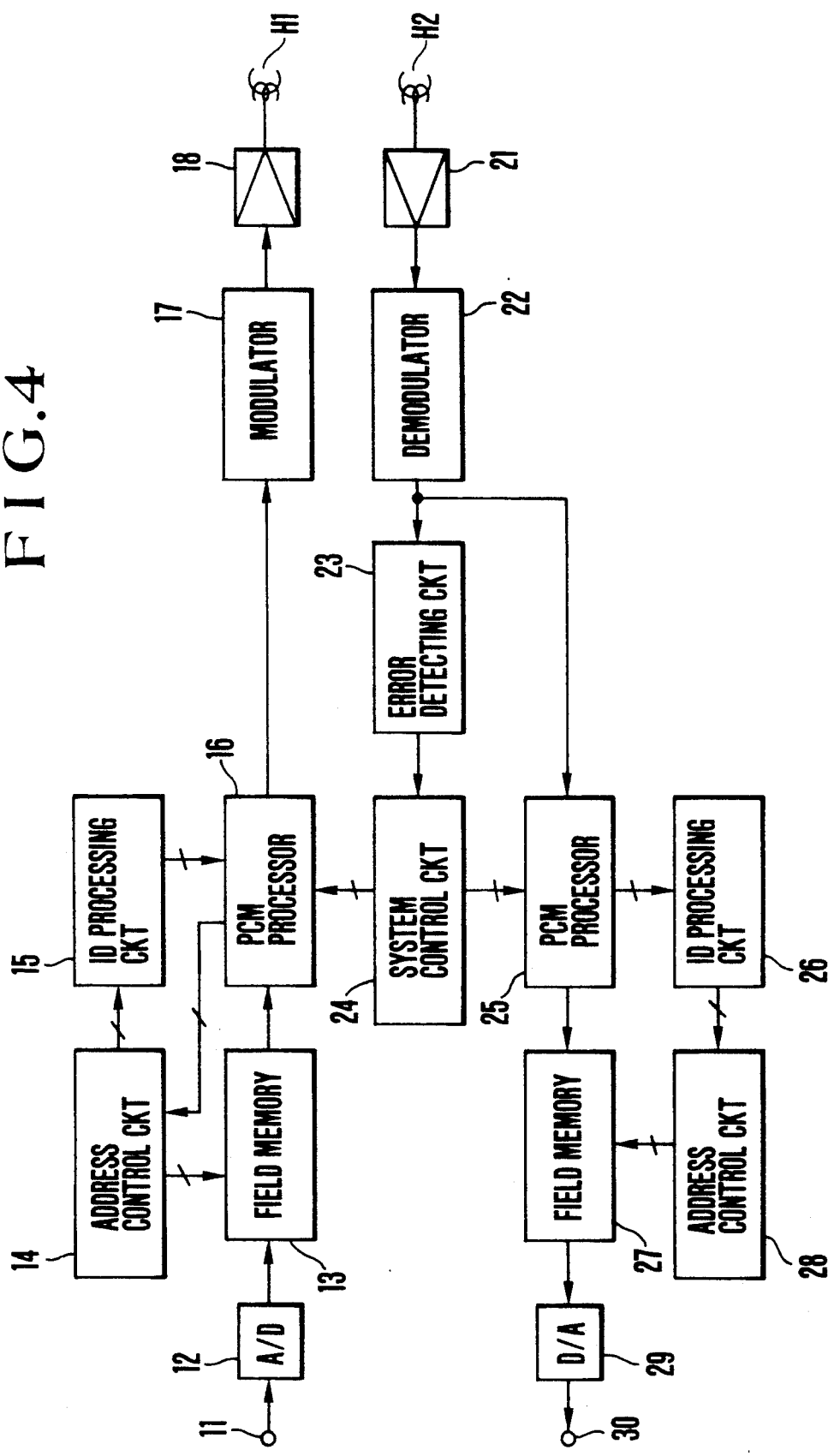
FIG. 4 is a block diagram showing in outline the arrangement of a data recorder which is arranged as an embodiment of this invention.

The following describes embodiments of this invention: FIG. 4 shows in outline the arrangement of an embodiment of the invention. Referring to FIG. 4, a terminal 11 is arranged to receive an analog video signal from a camera or the like which is not shown. In the case of this embodiment, the data recorder is arranged to convert this analog video signal into digital data and to record or reproduce the digital data with one field taken as the unit of the record: An analog-to-digital (hereinafter referred to as A/D) converter 12 is arranged to digitize the analog video signal coming to the terminal 11. A field memory 13 is arranged to be capable of storing one field portion of the digitized video signal. An address control circuit 14 is arranged to control the writing and reading addresses of the field memory 13. An ID processing circuit 15 is arranged to form such data as control data, character data, etc. (hereinafter refer red to as ID data) that are other than video data and to produce the ID data. A PCM processor 16 is arranged to perform various processing actions such as an interleaving action on the video data and the ID data, a process of adding redundant codes such as an error detection code and an error correction code, etc. and to produce PCM data as a result of these actions. A modulator 17 is arranged to digital-modulate the PCM data produced from the PCM processor 16. A reference numeral 18 denotes a recording amplifier.

The illustration includes a reproduction amplifier 21; and a demodulator 22 which corresponds to the modulator 17. An error detecting circuit 23 is arranged to detect the number of occurrences of data error, a data error occurring pattern, etc. by using the error detection and correction codes included in the PCM data obtained via the demodulator 22. A system control circuit 24 is arranged to control the whole apparatus. A PCM processor 25 is arranged to perform various processing actions in a manner reverse to the actions performed by the PCM processor 16. In other words, the PCM processor 25 performs deinterleaving and error-correcting processes. An ID processing circuit 26 is arranged to produce control data of varied kinds based on the ID data obtained from the PCM processor 25 and also produces data other than the video data. A field memory 27 is arranged to receive the video data produced from the PCM processor 25. An address control circuit 28 is arranged to control the writing and reading addresses of the field memory 27. A digital-to-analog (hereinafter referred to as D/A) converter 29 is arranged to convert the digital video data read out from the field memory 27 into an analog video signal. An output terminal 30 is arranged to produce the analog video signal.

Figure 5A:
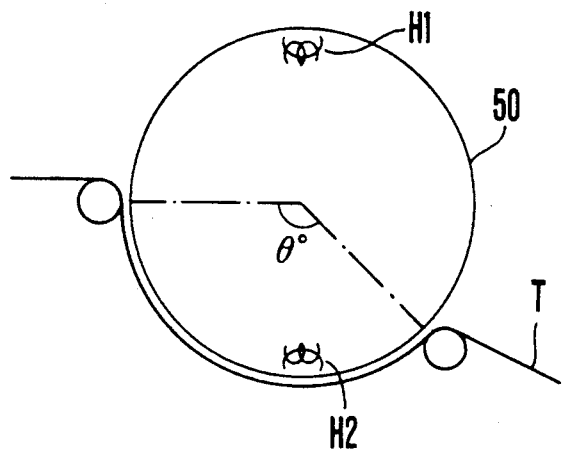
FIGS. 5(a) and 5(b) show the head arrangement of the recorder of FIG. 4.
Figure 5B:
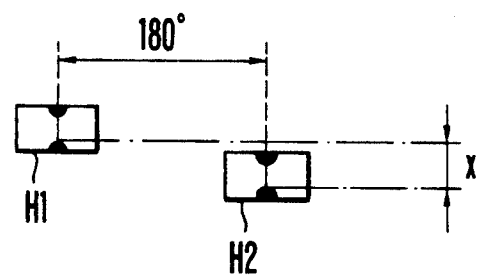
Figure 6:
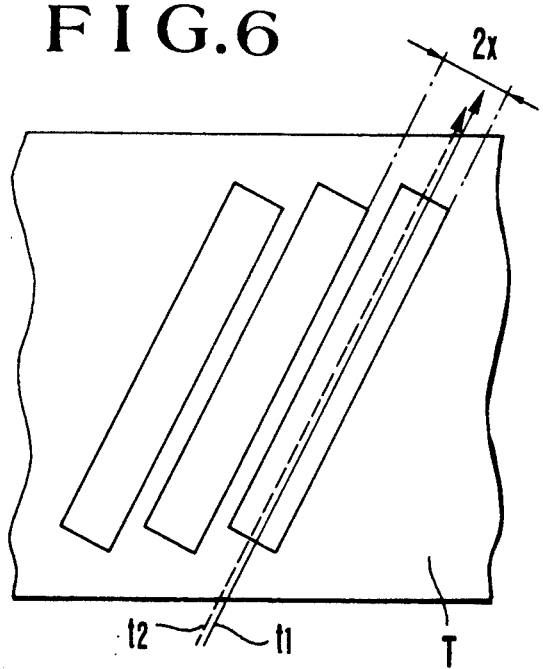
FIG. 6 shows the tracing locus of each of the heads of the data recorder of FIG. 4.

Reference symbols H1 and H2 denote rotary heads which are arranged as shown in FIGS. 5(a) and 5(b). As shown in FIG. 5(a), these heads H1 and H2 are mounted on a rotary drum 50 with a phase difference of 180 degrees from each other. Meanwhile, a magnetic tape T is wrapped around the drum 50 over an angle range $\theta°$ not exceeding 180 degrees. The head H1 is used for data recording and the head H2 for data reproduction. As shown in FIG. 5(b), the heads H1 and H2 have the same azimuth angle and are arranged to revolve on different planes which differ from each other a given distance X in the direction of axis of revolution. With recording arranged to be performed by using the head H1 only and the length of each track assumed to be sufficiently short for a recording track pitch, this distance X is ½ of the recording track pitch. The center lines of tracing loci of the heads H1 and H2 become as represented by lines t1 and t2 in FIG. 6. The tracing locus of the head H1 is thus arranged to be followed by the head H2.

Figure 7:
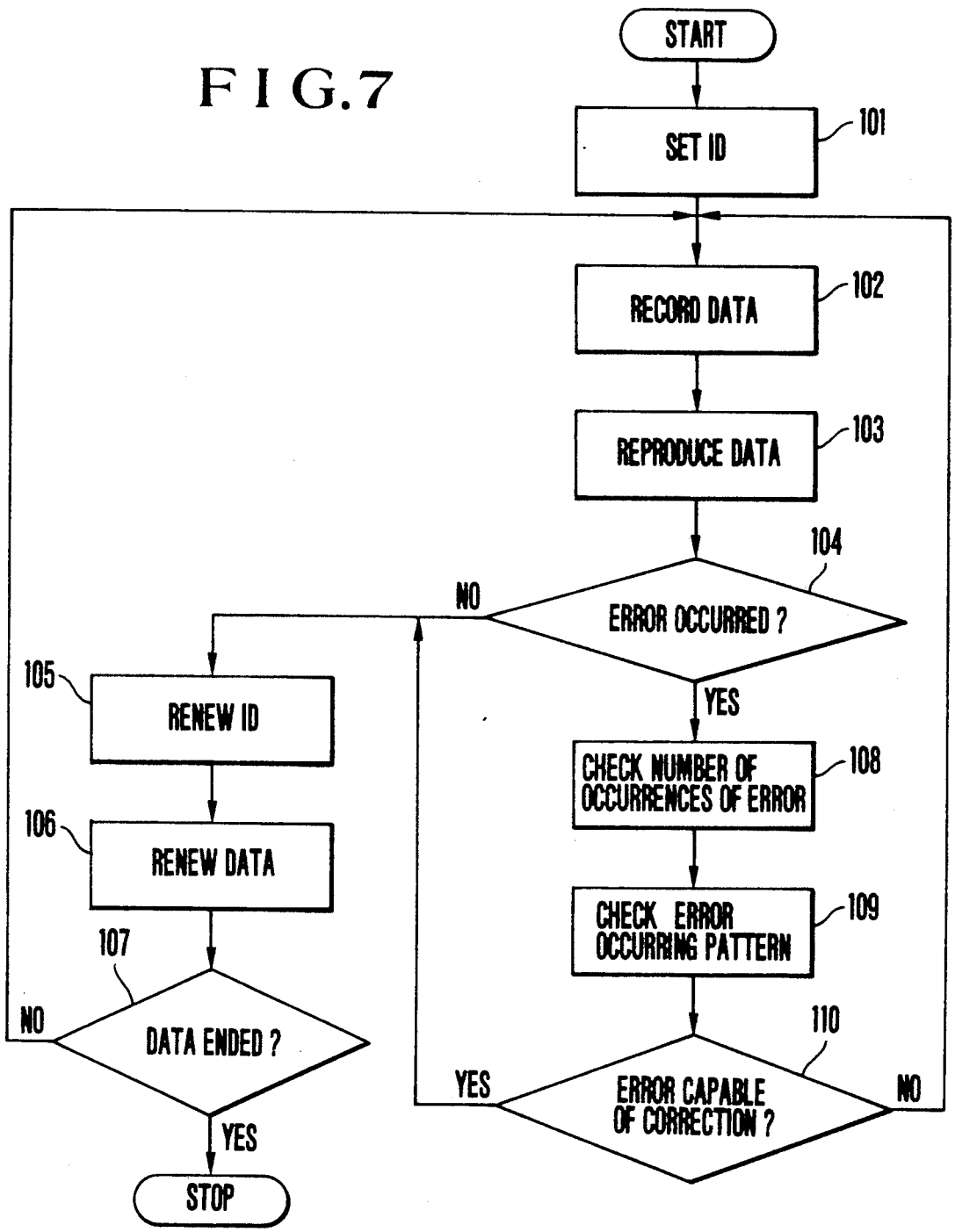
FIG. 7 is a flow chart showing the recording operation of a system control circuit of the recorder of FIG. 4.

With the data recorder arranged in the above stated manner, data recording and reproducing operations of the recorder are performed in the following manner:

FIG. 7 shows in a flow chart the operation of the system control circuit 24 to be performed for data recording. For data recording, one field portion of digital video data which is produced from the A/D converter 12 is written into the field memory 13 in response to an operation performed on an operation member (not shown). The digital data which is obtained by digitizing a video signal in real time has a very high bit rate. Therefore, the field memory 13 produces one field portion of the video data, i.e. still picture data, at a lowered bit rate. As a result of this, the one-field portion of the video data is recorded over many tracks.

At a step 101 of FIG. 7: The ID processing circuit 15 sets the ID data. The ID data includes among others track number data indicating the location of or a track number assigned to each track in which a part of the one-field portion of video data is to be recorded. At a step 102: When the head H1 reaches a given revolving phase, one track amount of data is recorded by the head H1. The recording process comes to an end when the drum 50 rotates $\theta$ degrees. At a step 103: When the drum 50 further rotates $(180-\theta)$ degrees, the reproducing head H2 reaches the start point of the freshly recorded track to reproduce the recorded data from this track. The reproduced signal of the reproducing head H2 which is thus obtained is supplied via the recording amplifier 21 to the demodulator 22. The error detecting circuit 23 detects the number of data errors, an error occurring pattern, etc. by using the error correction code, etc. produced by the demodulator 22. At a step 104: A check is made for occurrence of any data error. If no data error is found, the flow of operation comes to a step 105. At the step 105: A part of the ID data such as the track number data is renewed. At a step 106: Data to be recorded is supplied from the field memory 13 to the PCM processor 16. At a step 107: When the amount of data to be recorded comes to an end, the operation according to this flow chart is brought to an end. If the recording data is found not to have reached its end, the flow comes back to the step 102 to record data in a next track.

If any data error is found to have occurred at the step 104, the flow comes to a step 108. At the step 108: A check is made to find how many data errors have occurred. At a step 109: A check is made for the data error occurring pattern. At a step 110: A discrimination is made between the capability and the incapability of correction of the error on the basis of the results of the above stated checks. If the error is determined to be capable of correction at the step 110, the flow of operation comes back to the step 102 via the steps 105, 106 and 107 to perform data recording in a next track as mentioned in the foregoing. If the data error is determined to be incapable of correction at the step 110, the flow comes back to the step 102 to record the same data in the next track without renewing the ID data, the recording data and the reading address of the field memory 13.

In the processing operation according to the flow chart of FIG. 7, the processing period of time from the end of reproduction at the step 103 to the start of recording at the step 102 is of course arranged to be within a period of time required for the $\theta$ degree rotation of the drum 50.

As mentioned above, in case that the error of recording data is determined to be incapable of correction through the verifying process performed immediately after recording, the same data is repeatedly recorded. Since the drum 50 and the tape T are not stopped from rotating and travelling, this arrangement ensures highly reliable data recording. Therefore, data recording operations can be carried on one after another to permit highly reliable data recording within a short period of time.

Figure 8:
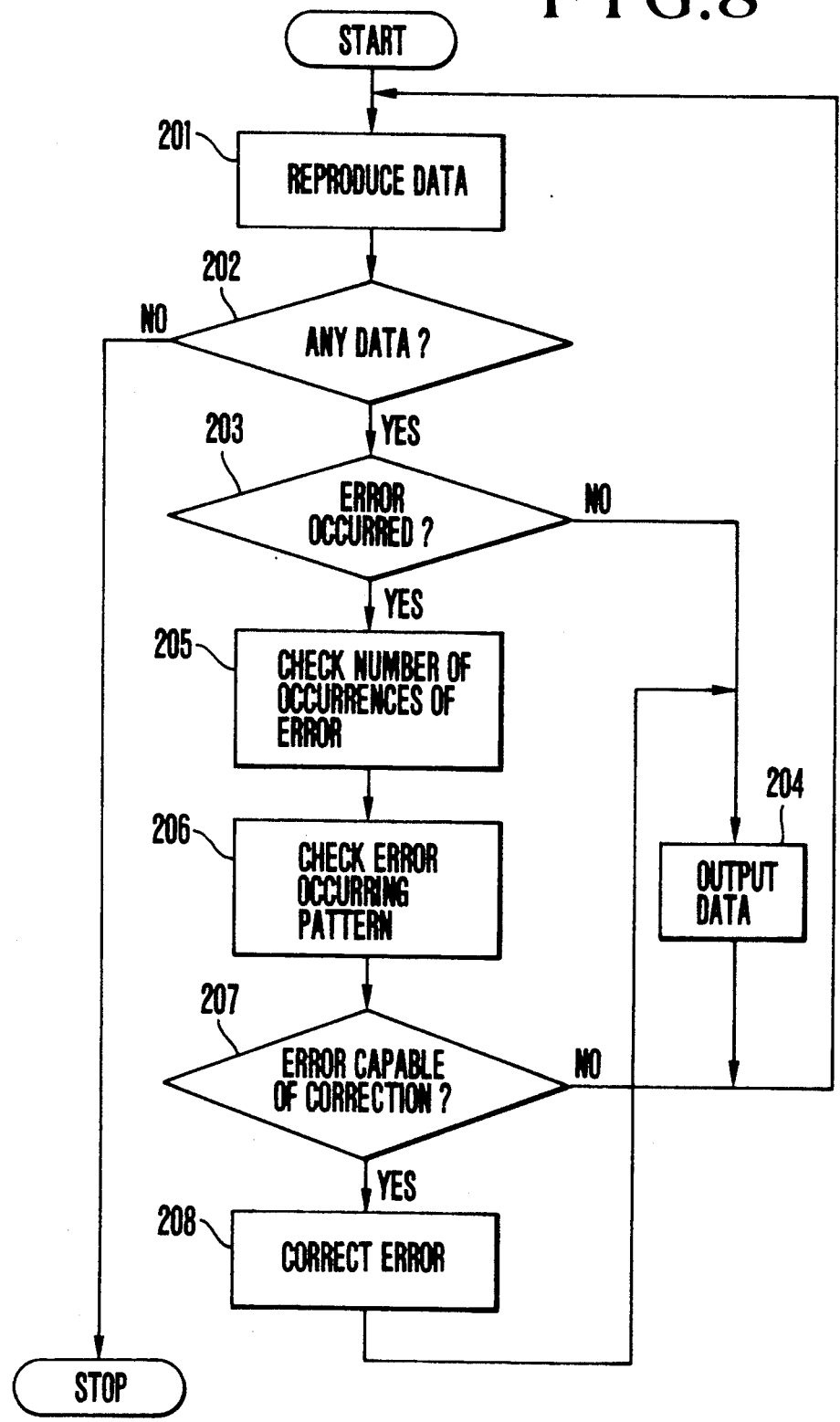
FIG. 8 is a flow chart showing the reproducing operation of the system control circuit of the recorder of FIG. 4.

Referring now to the flow chart of FIG. 8, the embodiment performs a data reproducing operation in the following manner: At a step 201: The reproducing head H2 begins a data reproducing action. At a step 202: A check is made for a data record. If a data record is found, the flow proceeds to a step 203. At the step 203: The output of the error detecting circuit 23 is checked for any data error. If no data error is detected, the flow comes to a step 204. At the step 204: The PCM processor 25 performs a deinterleaving process on the data. The deinterleaved data is written into the field memory 27 in accordance with the address determined on the basis of the ID data reproduced. In the event of occurrence of a data error, the flow comes to a step 205. At the step 205: A check is made for the number of errors occurred on the basis of the detection result of the error detecting circuit 23. At a step 206: A check is made for the pattern in which the errors have occurred. At a step 207: A discrimination is made between capability and incapability of correction of the error. If the errors are found to be capable of correction, the flow proceeds to a step 208. At the step 208: An error correcting process is performed and, after that, the flow comes to the step 204 to produce the data through the deinterleaving process. In the event of the error incapable of correction, the same data as the reproduced data is assumed to be recorded in a next track. Then, without outputting the reproduced data, the flow comes back to the step 201 to reproduce the recorded data from the next track. The period of time from the end of the step 201 to the return of the flow back to the step 201 is of course set to be identical with a period of time required for the $(360-\theta)$ degree rotation of the drum 50.

In the case of the data recorder described above, the reproducing head is arranged to serve also as a verifying head. The data recorder is arranged to be a data recording and/or reproducing apparatus in a simplified manner using the error detecting circuit 23 both for recording and for reproduction. Further, for reproduction, only such data that is highly reliable is written into the field memory 27. The reliability of the still image data which is obtained by repeatedly reading out the data stored in the field memory 27 becomes very high.

In the flow chart of FIG. 7, the determination as to whether the same data is to be again recorded is made on the basis of a discrimination between capability of correction of data and incapability of correction of data. However, for a still higher degree of reliability of the data, the determination may be made on the basis of a discrimination made between occurrence and non-occurrence of data errors.

Generally, the reliability of recording data varies with the kind of the data. Therefore, the basis of the determination as to whether the data is to be recorded again or not may be changed according to the kind of the data. Further, during reproduction, the judgment as to whether the same data is recorded in the next track, i.e. whether reproduced data is to be produced is made on the basis of a discrimination between the capability and incapability of correction of the data error in the case of the flow chart of FIG. 8. However, this may be changed to make the above stated judgment on the basis of the result of a check made by somewhat delaying the data producing timing to see whether the track number data included in the ID data detected immediately after reproduction of a next track comes to show a change.

Figure 9:
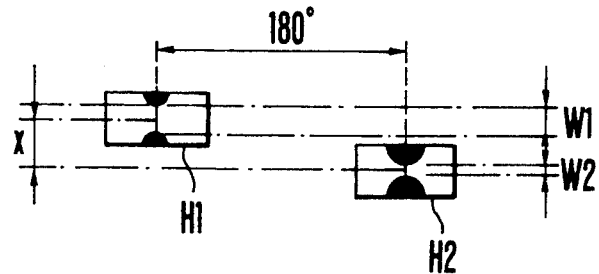
FIG. 9 shows another example of head arrangement of the data recorder of FIG. 4.

The arrangement of the rotary heads H1 and H2 may be changed as shown in FIG. 9. The head arrangement of FIG. 9 differs from that of FIG. 5 in that the head width W1 of the head H1 is arranged to be wider than the head width W2 of the other head H2. With the width of the head H2 thus arranged to be narrower than the width of the recording track, the probability of occasioning the re-recording action can be minimized, so that highly reliable data recording can be accomplished within a very short period of time. The arrangement to reproduce the data by means of the narrow width head H2 lessens the probability of having a data error due to a cross-talk from an adjoining track. This advantage is salient particularly in the case of an apparatus of the rotary head type which tends to have a tracking error.

Figure 10:
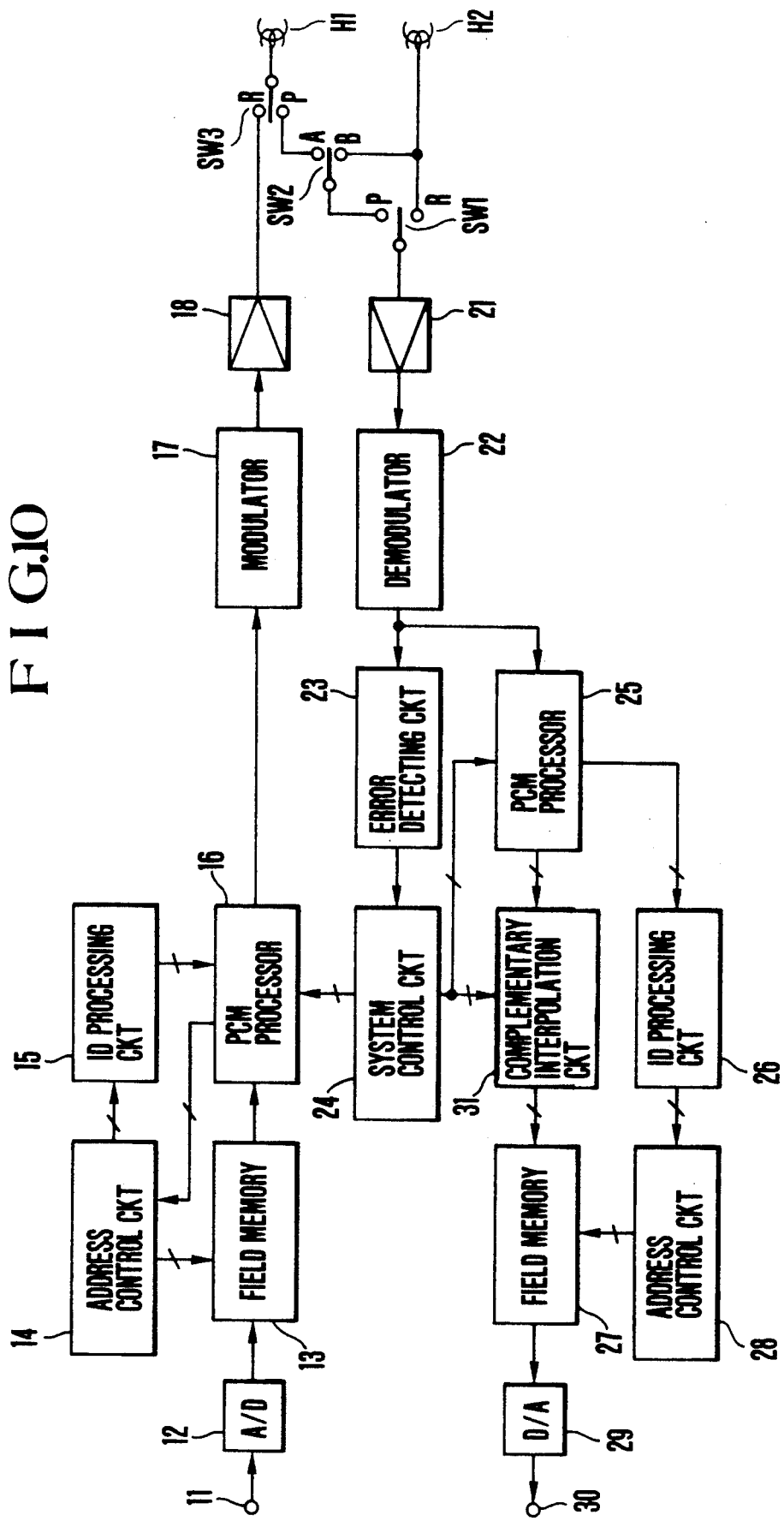
FIG. 10 is a block diagram showing in outline the arrangement of a data recorder which is arranged as another embodiment of the invention.

FIG. 10 shows in outline the arrangement of a data recorder as another embodiment of the invention. In this drawing, the same component parts as those of FIG. 4 are indicated by the same reference numerals and the details of them are omitted from description. The embodiment includes a complementary interpolation circuit 31 which is arranged to receive the output of the PCM processor 25 and to supply video data to the field memory 27; and selection switches SW1, SW2 and SW3.

In recording data, the connecting positions of the switches SW1 and SW3 are on one side R of them to allow the data to be recorded on the tape in the same manner as in the case of the recorder of FIG. 4.

In reproducing the recorded data, the positions of the switches SW1 and SW3 are on another side P respectively. The switch SW2 is caused by a control circuit which is not shown to shift its connecting position alternately between terminals A and B every time the drum 50 turns around 180 degrees. Referring to the flow chart of FIG. 12, the reproducing operation of the system control circuit 24 is described as follows:

At a step 211: The ID data which is reproduced by the head H1 is read out. At a step 212: A check is made for any data record. If a data record is determined to be existing, the flow of operation proceeds to a step 213. At the step 213: A check is made for occurrence of any data error. If no data error has occurred, the flow comes to a step 229. If any data error is found to have occurred, the flow comes to a step 215. At the step 215: A check is made for the number of data error occurrences on the basis of the result of detection made by the error detecting circuit 23. At a step 216: A check is made for a data error occurring pattern. At a step 217: A discrimination is made between the capability and incapability of correction of the data error. If the error is determined to be capable of correction, the flow comes to a step 218 to carry out an error correcting process and, after that, comes to the step 229. If the error is determined to be incapable of correction, the flow comes to a step 219. At the step 219: The flow waits until the connecting position of the switch SW2 is shifted to its one side B. After that, the ID data produced from the head H2 is read out. At steps 223 to 228: The reproduced data obtained from the head H2 is processed in the same manner as at the steps 213 to 218. At the step 229: When the connecting position of the switch SW2 is shifted back to its side A, the ID data reproduced by the head H1 is read out. Then, the track number data included in the ID data read out this time is compared with the track number data included in the ID data previously read out. At a step 231: A check is made to see if the data being reproduced from the currently accessed track relates to the same information as the data reproduced from the track accessed immediately before. In other words, the check is made to find whether the data has been renewed. If the data is found not renewed, the currently accessed track can be considered to be a second track or a subsequent track among a plurality of tracks having one and the same data recorded therein by a verifying process during the recording operation. In this case, the flow comes back to the step 212. In case that the data is found to have been renewed, the flow comes to a step 233. At the step 233: Data is produced from the complementary interpolation circuit 31.

Figure 11:
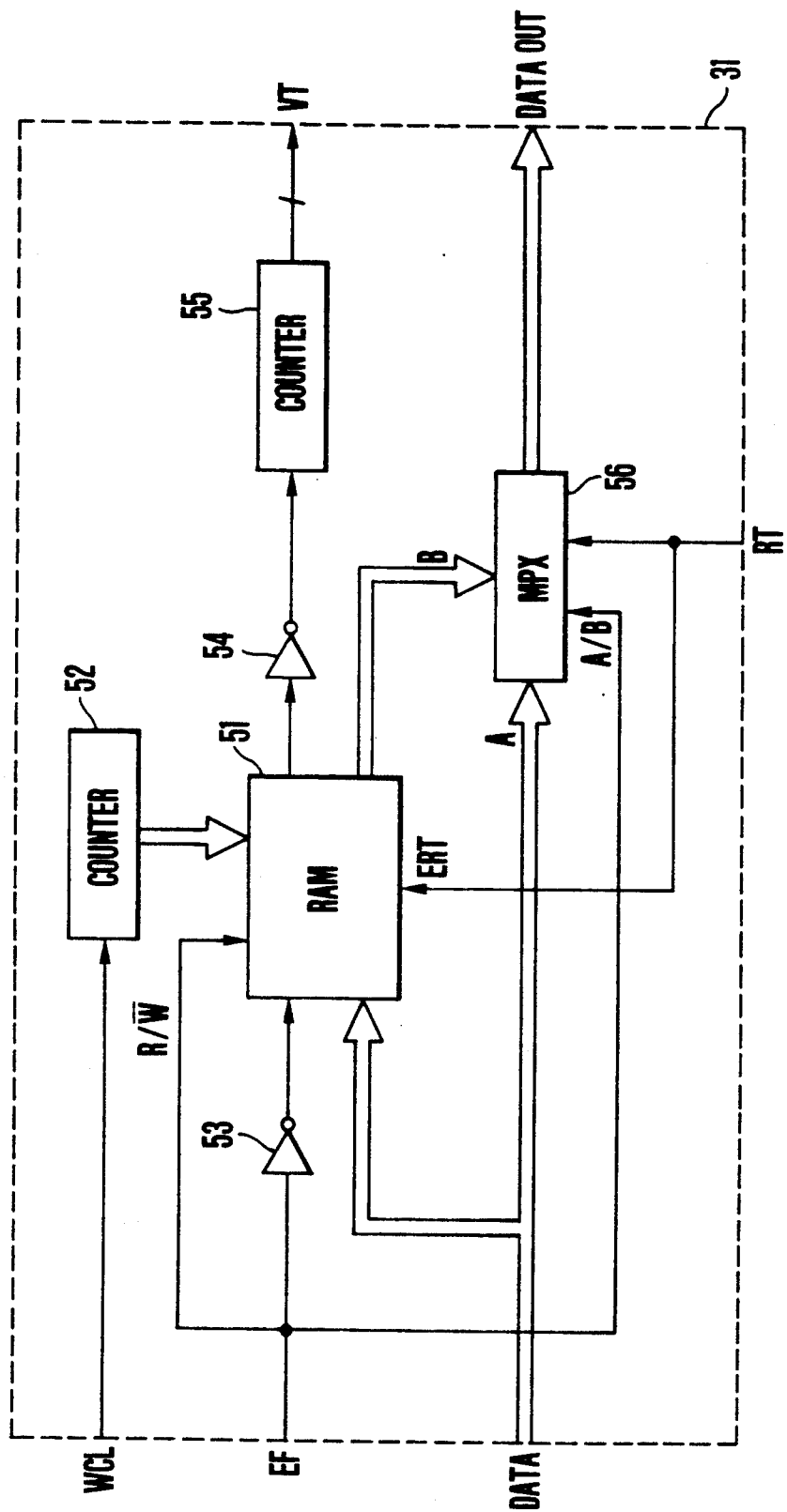
FIG. 11 shows the details of the essential parts of the recorder of FIG. 10.

Referring to FIG. 11, the complementary interpolation circuit 31 is arranged as follows: A word clock signal WCL is supplied from the system control circuit 24. The word clock signal WCL is synchronized with each word of data which is indicated by a reference symbol DATA in FIG. 11. The data DATA is the data produced from the PCM processor 25 and thus has already undergone an error correcting process. An error flag EF is supplied also from the PCM processor 25 to show whether the data DATA is erroneous or not.

The data DATA which is thus received is supplied to a random access memory (RAM) 51 which is arranged as a buffer memory and to one side A of a multiplexer (hereinafter referred to as MPX) 56. The address of the RAM 51 is determined by an address counter 52 which is arranged to count the word clock signal WCL. The writing mode or reading mode of the RAM 51 is arranged to be determined according to the error flag EF for every word. In other words, only the words that have no error are allowed to be written into the RAM 51. The RAM 51 takes the reading mode when any erroneous word is received. Meanwhile, the MPX 56 is arranged to produce therefrom data received on its side B when an erroneous word is received and to produce data received on its side A when a correct word is received. An output trigger signal RT is supplied from the system control circuit 24 in connection with the step 233 of FIG. 12. This trigger signal RT is obtained for one track amount of data and is arranged to determine whether data is to be produced from the MPX 56.

Figure 12:
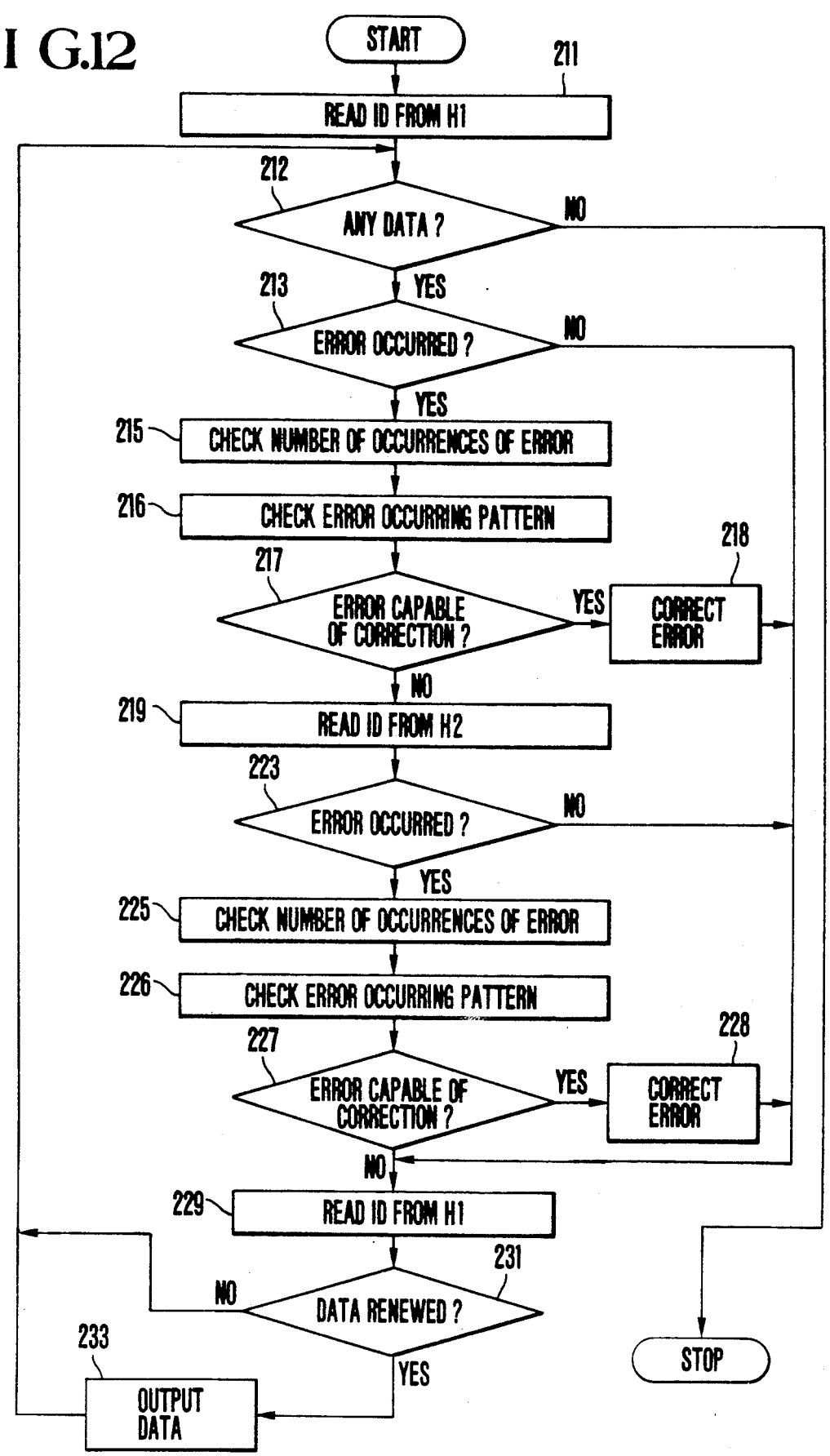
FIG. 12 is a flow chart showing the reproducing operation of a system control circuit of the recorder.

Referring to the flow chart of FIG. 12, if the data DATA which is to be produced at a step 233 of the flow chart is errorless data including error corrected data, the MPX 56 always produces the data supplied to the side A thereof. In case that the data DATA includes some erroneous data, data which is read out from the RAM 51 is produced from the MAX 56 of the interpolation circuit 31 when the erroneous data is supplied. Before the output mode of the MPX 56 obtains, the MPX 56 receives an amount of data corresponding to 2x tracks, wherein x represents a number of tracks in which data for one and the same information is continuously recorded. During this period, at the RAM 51, addresses at which data errors occurred in the data DATA are replaced with errorless words one after another. The MPX 56 eventually produces errorless data in the amount corresponding to 2x tracks unless a data error happens to occur for a word of the same address.

The error flag EF is stored for every word address in a given area provided within the RAM 51. The content of the area is also rewritten every time the error flag EF is supplied. The data of the area is reset by an edge part of the trigger signal RT immediately after a reading action is performed by the MPX 56. In reading data out from the RAM 51, an error flag indicating whether any data error has occurred in each of the read out words is supplied to an inverter 54. A counter 55 is arranged to count the flags. When a counted value thus obtained is more than "1," it shows that some data error is included in the data produced from the MPX 56.

The embodiment may be arranged in such a manner that, if the counted value of the counter 55 exceeds "1" when the trigger signal RT is at a high level, a reproducing action is again performed on one and the same track by rewinding the tape to a predetermined extent.

Figure 13:
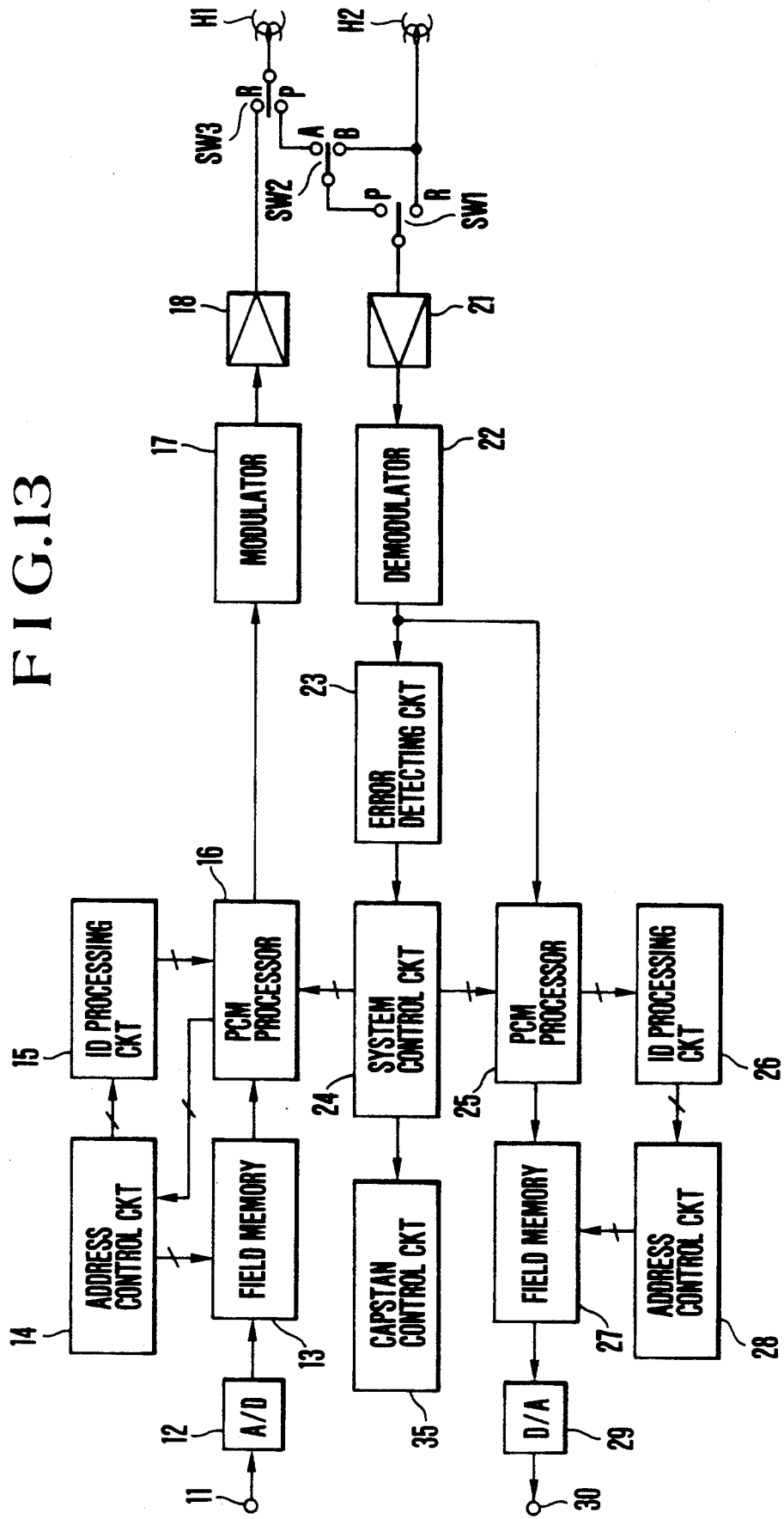
FIG. 13 is a block diagram showing in outline the arrangement of a data recorder which is arranged as a further embodiment of the invention.

FIG. 13 is a block diagram showing in outline the arrangement of a data recorder which is arranged as a further embodiment of this invention. In FIG. 13, the same component parts as those of FIG. 4 or 10 are denoted by the same reference numerals. The recording operation of the recorder is the same as in other embodiments shown in FIGS. 4 and 10 and thus requires no description.

Figure 14:
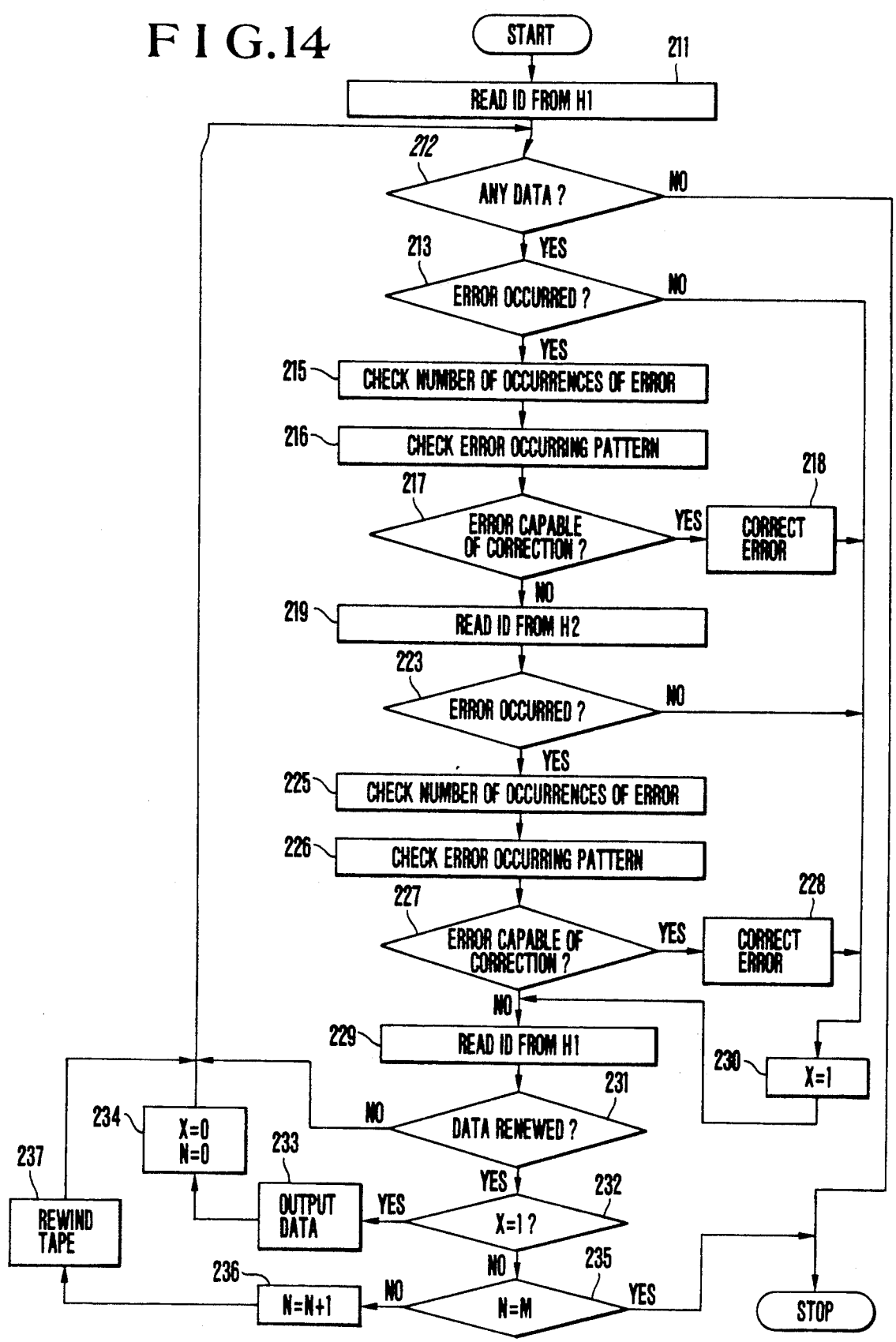
FIG. 14 is a flow chart showing the reproducing operation of a system control circuit of the recorder of FIG. 13.

FIG. 14 is a flow chart showing the reproducing operation of the system control circuit 24 of the data recorder which is arranged as shown in FIG. 13. In the flow chart, the same step numbers are assigned to steps which are the same as those of FIG. 12. The flow of operation is similar to that of the data recorder of FIG. 10 up to the step 229. At a step 230: In cases where error correction is possible or where there exists no error, a variable X is set at "1".

After the connecting position of the switch SW2 is shifted back to its one side A, the ID data reproduced by the head H1 is read out at the step 229. At a step 231: A check is made to see if the ID data is a renewed ID data. Following this, a check is made to see whether the data record of the track currently accessed for reproduction relates to the same information as the data record of the track last accessed. In other words, a discrimination is made between renewed and non-renewed states of the data recorded. If the data is found not renewed, the currently accessed track can be regarded as a second or subsequent track among a plurality of tracks having the same data recorded through a verifying action performed during recording. In this case, the flow comes back to the step 212. In the event of renewed data, information recorded in the track last accessed for reproduction is checked to see if it can be produced. If, any data capable of error correction has been reproduced either form the immediately preceding (last accessed) track or from any of the previously accessed tracks related to the same information as the immediately preceding track, the above stated variable X must have been set at "1". In view of this, therefore, a check is made for "X=1" at a step 232. In the case of "X=1", the flow comes to a step 233. At the step 233: The PCM processor 25 produces either correct data or errorless data. When the data output is completely produced, both the above stated variable X and another variable N which will be described later on are set at "0".

If the state of "X=1" has not been obtained, that is, in the event of "X=0", it indicates that no data capable of error correction is reproducible for the information to be reproduced from any of tracks nor by any of the heads. In that event, the flow comes to a step 237. At the step 237: The tape is rewound to a given extent and a reproducing action is performed again on the same track. The variable N is provided for counting the number of times for which the tape rewinding process is performed. Every time the tape is rewound in this manner, 1 is added to the variable N. If no data capable of error correction is reproducible with the tape rewinding process repeated M times, the processing operation is brought to a stop by making a check for a state of "N=M" at a step 235. The operation is also brought to a stop also when no reproducing data is found any longer at the step 212. Further, the above stated control over the tape transport is accomplished by controlling a capstan control circuit 35 by the system control circuit 24.

The above stated reproducing operation is performed only in cases where no data capable of error correction cannot be reproduced by temporarily rewinding the tape and by reproducing data record either with the head H1 or H2 from one or more tracks related to one and the same information. The tape is, therefore, rewound not many times, so that the data record can be reliably reproduced without prolonging the length of time required for reproduction.

Figure 15:
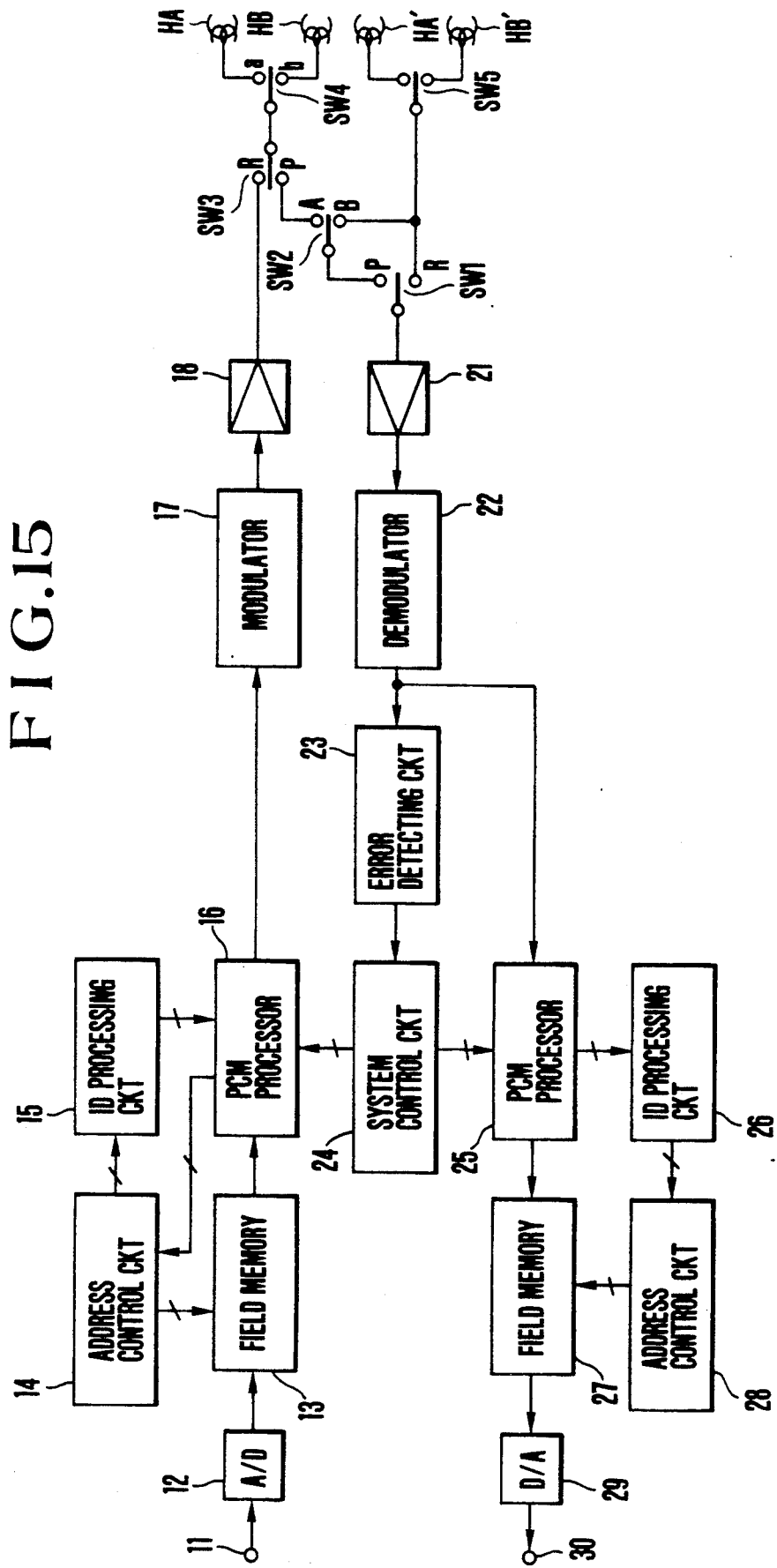
FIG. 15 is a block diagram showing in outline the arrangement of a data recorder which is arranged as a further embodiment of the invention.
Figure 16A:
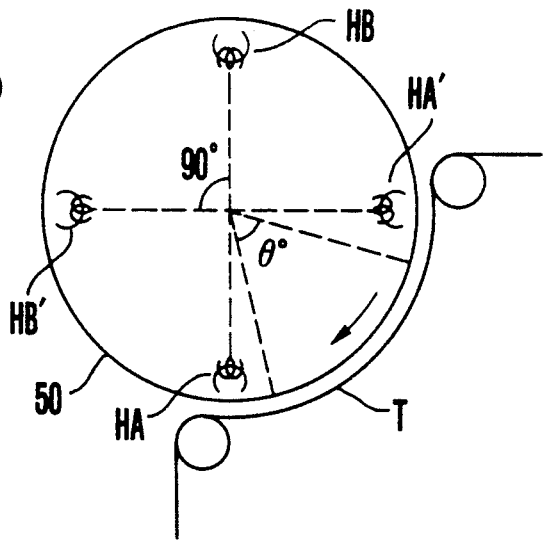
FIGS. 16(a) and 16(b) show the head arrangement of the recorder of FIG. 15.
Figure 16B:
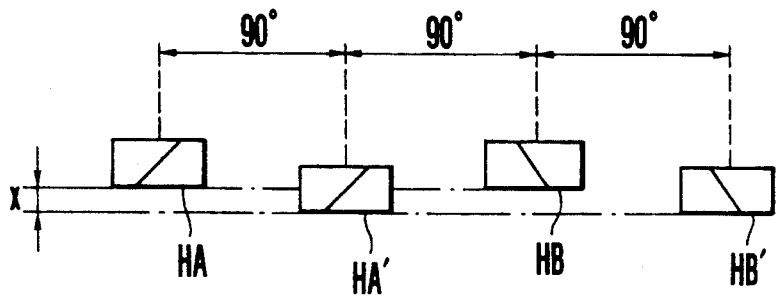
Figure 17:
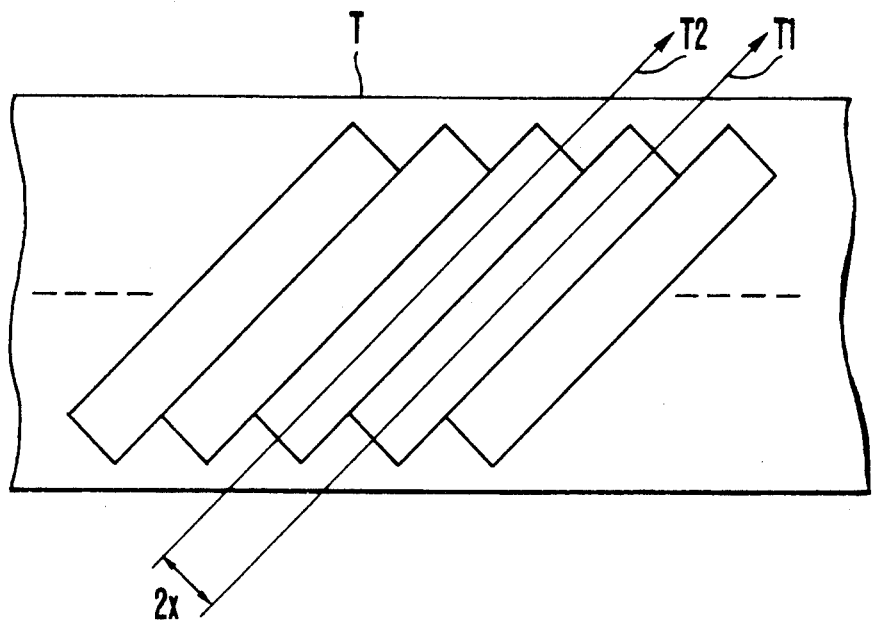
FIG. 17 shows the tracing loci of the heads of the recorder of FIG. 15.

FIG. 15 shows in outline the arrangement of a data recorder which is arranged as a further embodiment of the invention. In FIG. 15, the same component parts as those of FIG. 13 are denoted by the same reference numerals. Rotary heads HA, HA', HB and HB' are arranged as shown in FIGS. 16(a) and 16(b). As shown in FIG. 16(a), the heads HA and HB are mounted on a rotary drum 50 at a phase difference of 180 degrees between them. A magnetic tape T is wrapped around the drum 50 at an angle $\theta$ not exceeding 90 degrees. Each head is arranged to record data while the drum 50 rotates to the angle degree of $\theta$. The heads HA and HB are used for recording and the heads HA' and HB' for reproduction. As shown in FIG. 16(b), the heads HA and HA' have the same azimuth angle while the heads HB and HB' have another azimuth angle. The azimuth angle of the head HA thus differs from that of the head HB. Further, the heads HA' and HB' are arranged to revolve on a plane which differs as much as a given distance X from the revolving plane of the heads HA and HB. This distance X is ½ of a recording track pitch with the length of each track arranged to be sufficiently short in relation to the recording track pitch. With the heads arranged in this manner, when the center line of the tracing locus of the heads HA and HA' is as shown by a line T1 of FIG. 17, that of the heads HB and HB' becomes as shown by a line T2 in FIG. 17. In other words, the tracing loci of the heads HA and HB are followed by the heads HA' and HB'.

The operation of the system control circuit 24 in the recording operation of this embodiment is performed in accordance with the flow chart of FIG. 7. However, since the connecting positions of switches SW4 and SW5 are shifted between their two positions respectively every time the drum 50 turns around 180 degrees, the steps 102 to 107 of the flow are repeated every time the drum 50 makes ½ turn in this embodiment while these steps are repeated every time the drum 50 makes one turn in the case of the embodiment shown in FIG. 4.

The operation of the system control circuit 24 for reproduction is performed in accordance with the flow chart of FIG. 12. However, the period of time required for the flow from the step 212 to its return to the step 212 is likewise reduced to ½ thereof in the case of this embodiment. In addition to that, the use of the heads is changed from the heads HA and HA' over to the heads HA and HB' and vice versa every time the above stated period of time is repeated.

Figure 18:
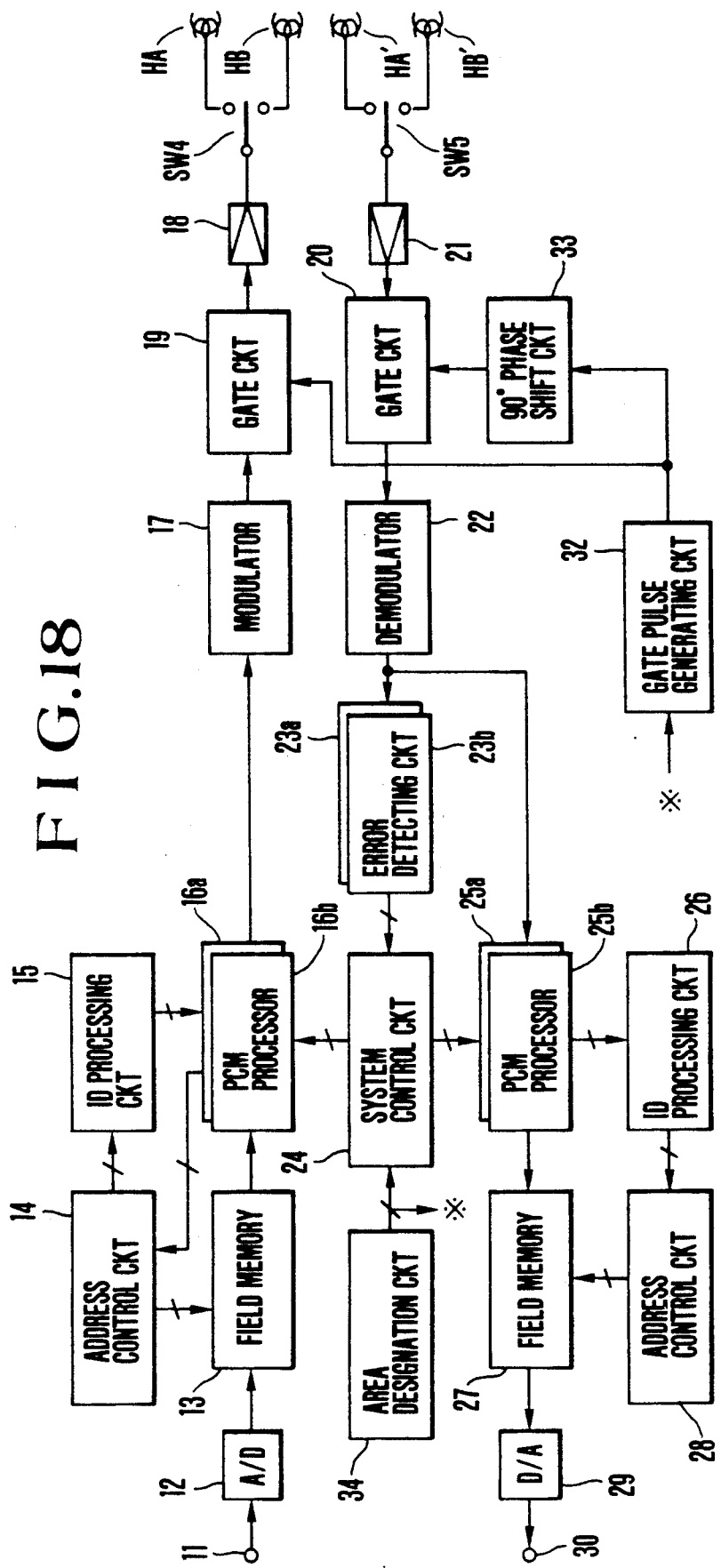
FIG. 18 is a block diagram showing in outline the arrangement of a data recorder which is arranged as a further embodiment of the invention.
Figure 19:
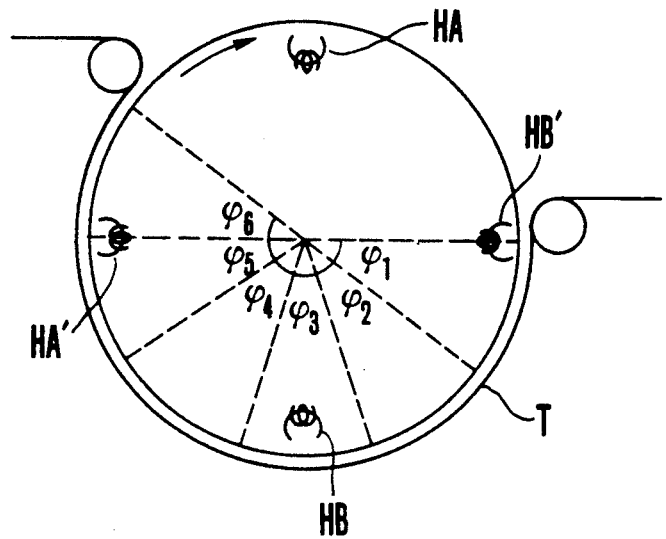
FIG. 19 shows the head arrangement of the recorder of FIG. 18.
Figure 20:
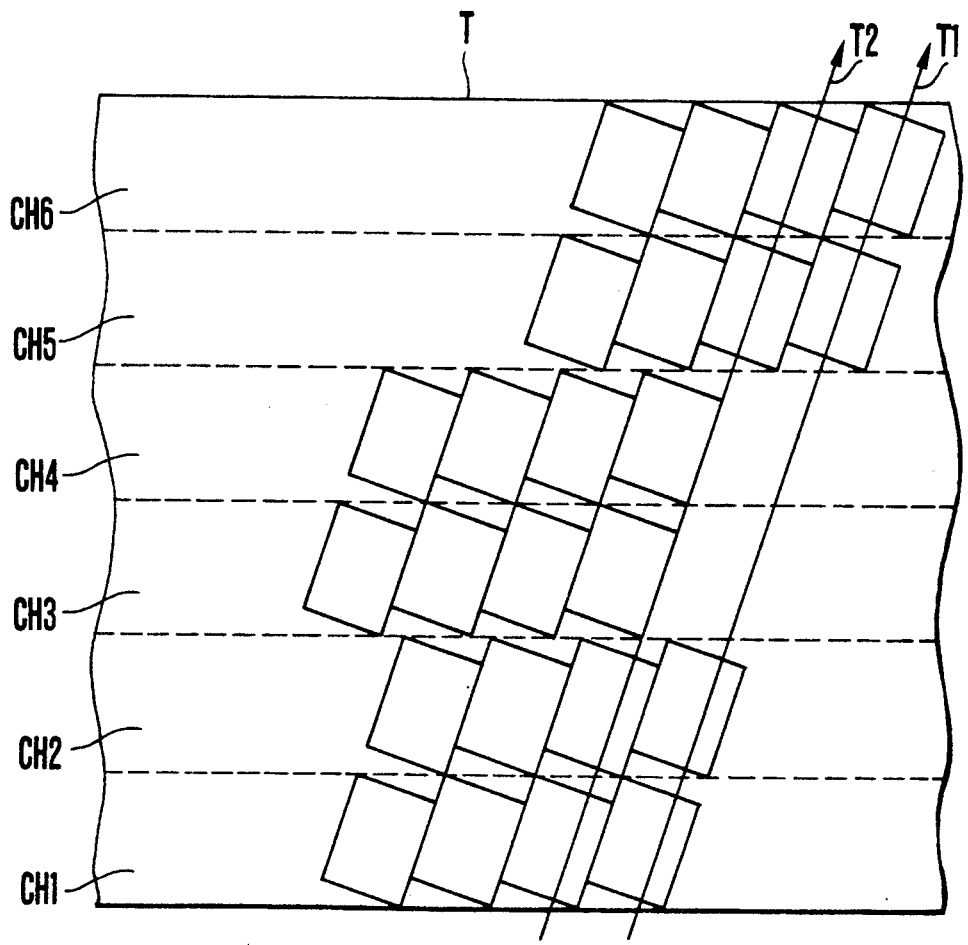
FIG. 20 is a tracing loci of the heads of the recorder of FIG. 18.

FIG. 18 shows in outline the arrangement of a data recorder which is arranged as a still further embodiment of the invention. The same component parts as those of FIG. 15 are indicated by the same reference numerals. FIG. 19 shows the head arrangement of this recorder. The heads HA, HA', HB and HB' are arranged in the same manner as shown in FIGS. 16(a) and 16(b). FIG. 20 shows recording loci or tracks formed on a tape by this embodiment. Referring to FIG. 20, the reference symbols CH1, CH2, CH3, CH4, CH5 and CH6 denote recording areas longitudinally extending on a magnetic tape T. The data recorder in the case of this embodiment is arranged to record data by pairing the recording area CH1 and CH2, the areas CH3 and CH4 and the areas CH5 and CH6 respectively. Referring to FIG. 18, an area designation circuit 34 is arranged to designate the use of one of the three pairs of recording areas for data recording or reproduction. The area designation circuit 34 may be arranged either to operate in response to a manual operation or to automatically operate by making a discrimination between a recorded state and a non-recorded state of each area.

Area designating data is produced via the system control circuit 24 to control the operation timing of PCM processors 16a and 16b and that of PCM processors 25a and 25b. The area designating data is supplied also to a gate pulse generating circuit 32. The gate pulse generating circuit 32 then generates a gate pulse which is supplied to a gate circuit 19. This causes the gate circuit 19 to operate at the timing at which the heads HA and HB trace the areas to be used for recording. For example, in case that some data is to be recorded in the areas CH1 and CH2, a recording signal is supplied to an amplifier 18 via the gate circuit 19 when the heads HA and HB are at revolving phases within angle ranges indicated by reference symbols $\phi1$ and $\phi2$ in FIG. 19. In FIG. 19, symbols $\phi1$ to $\phi6$ denote angle ranges within which the heads trace the areas CH1 to CH6 respectively. In the case of this embodiment, the tape T is arranged to be wrapped at least 216 degrees around the drum 50. Each of the angle ranges $\phi1$ to $\phi6$ is arranged to be 36 degrees. The revolving phases of the heads HA' and HB' are behind those of the heads HA and HB by 90 degrees respectively. Another gate circuit 20 is, therefore, controlled by a gate pulse which is obtained by delaying the gate pulse produced from the gate pulse generating circuit 32 by means of a phase shift circuit 33 for a period of time required for the 90 degree rotation of the drum 50. Further, assuming that the line T1 of FIG. 20 is traced by the center lines of the heads HA and HA', another line T2 is traced by those of the heads HB and HB'.

Figure 21:
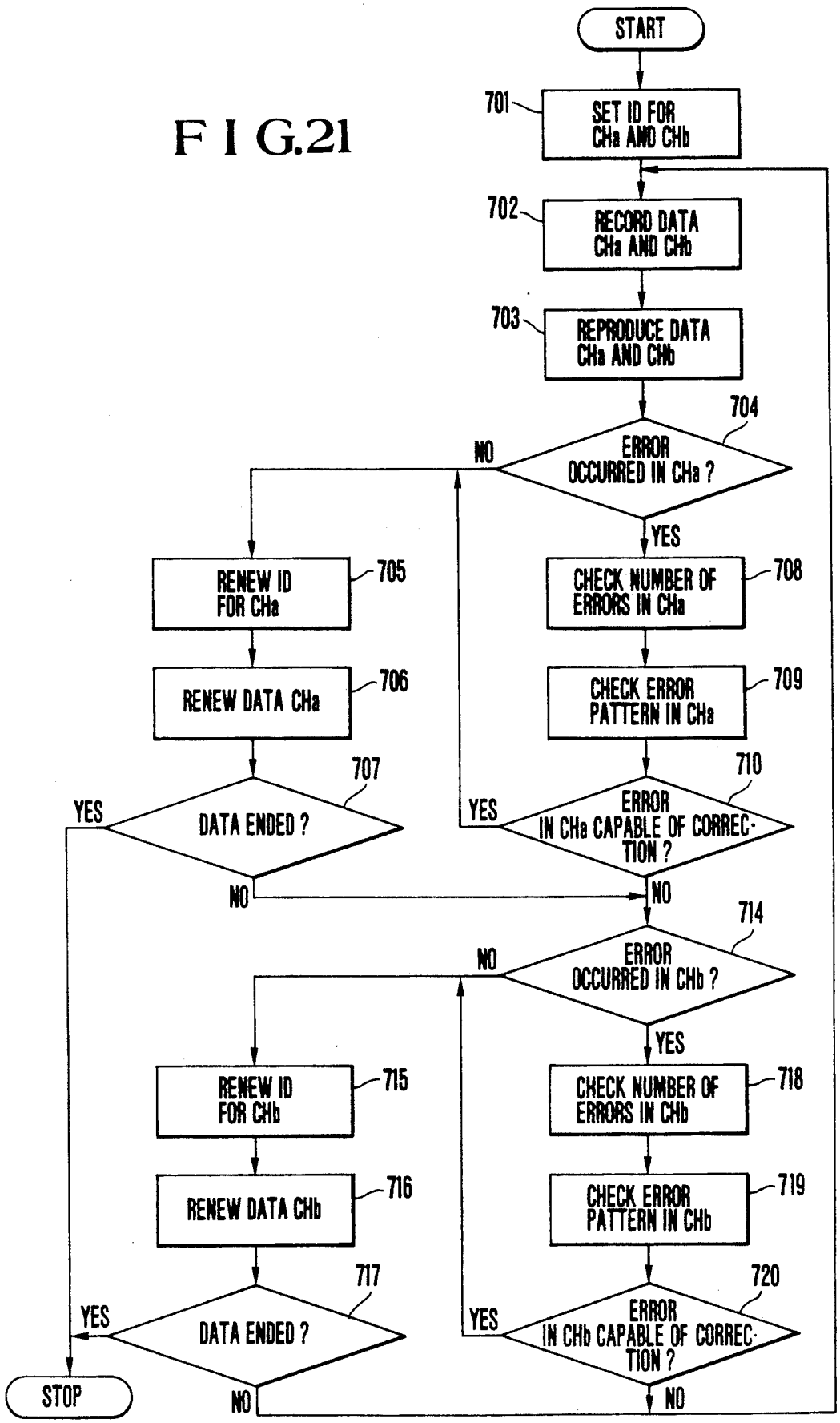
FIG. 21 is a flow chart showing the recording operation of a system control circuit of the recorder of FIG. 18.

The data recorder of this embodiment is arranged to record data while forming tracks in two of the six areas longitudinally extending on the magnetic tape. The PCM processors 16a and 16b are arranged to form PCM data signals to be recorded in these two areas and to produce these recording signals at different timings. Hereinafter, the data to be recorded or reproduced in or from first and second recording areas are called data CHa and data CHb respectively. The data recorder which is arranged in this manner performs data recording and reproducing operations as described below:

FIG. 21 is a flow chart showing the operation of the system control circuit 24 to be performed in recording data. Referring to the flow chart of FIG. 21, the data recording operation is as follows:

In response to an operation on an operation member which is not shown, an amount of digital video data for one field which is produced from the A/D converter 12 is written into the field memory 13. The digital data which is thus obtained by digitizing the video signal in real time has an extremely high bit rate. Hence, the field memory 13 is arranged to produce the one field amount of the video data, i.e. still image data, in a given amount at a time by lowering the bit rate. This enables the one-field amount of video data to be recorded in many tracks.

At a step 701 of FIG. 21: The ID processing circuit 15 sets the ID data which is to be added to the data CHa and CHb. The ID data includes among others track number data which indicates the track number of a track in which each part of the one-field amount of video data is recorded. At a step 702: When the recording head HA or HB reaches a revolving phase at which the head comes to trace the area designated by the area designating data, the head HA or HB records one track amount of data in each of the two areas respectively. This recording process comes to an end when the drum 50 turns around 72 degrees. When the drum 50 further rotates 18 degrees (90−72 degrees), the reproducing head HA' or HB' comes to the start point of a track in the area first recorded between the two recorded areas. At a step 703: The record tracks of the two areas are reproduced by the reproducing heads HA' and HB'. The reproduced signals from the reproducing head HA' and HB' are supplied to the demodulator 22 via the reproduction amplifier 21 and the gate circuit 20. The error detecting circuits 23a and 23b detect the number of data errors occurred and an error occurring pattern from the data CHa and CHb produced from the demodulator 22 by using an error correction code, etc. At s step 704: A check is made for any data error. When the data CHa is determined to have no data error, the flow comes to a step 705. At the step 705: The ID data including the track number data, etc. is partly renewed for the data CHa. At a step 706: Next, data which is to be recorded as the data CHa is supplied from the field memory 13 to the PCM processor 16a. At a step 707: If the amount of the data to be recorded is found to have come to an end, the processing operation according to this flow chart is terminated. If not, the flow comes to a step 714.

In case that some data error is considered to have occurred in the data CHa at the step 704, the flow comes to a step 708. At the step 708: A check is made to find the number of the data errors occurred. At a step 709: A check is made for a pattern in which the data errors have occurred. At a step 710: A check is made to see if the errors are capable of correction. If so, the flow comes to the steps 705 and 706 to renew the data CHa and the ID data thereof. After that, the flow comes to a step 714. If the errors of the data CHa are considered to be incapable of correction at the step 710, the flow proceeds to the step 714 without renewing the data CHa and the ID data for the data CHa. At steps 714 to 720: The data CHb is processed in the same manner as the manner in which the data CHa is processed at the steps 704 to 710. After completion of the processing operation, the flow comes back to the step 702.

In the flow of operation as shown in FIG. 21, the length of time from the end of reproduction at the step 703 to the start of reproduction at the step 702 is of course arranged to be within the period of time during which the drum 50 turns around 18 degrees.

Further, in the case of the above stated flow chart, the steps 704 to 710 for processing the data CHa and the steps 714 to 720 for processing the data CHb are arranged to be serially executed after both the data CHa and CHb are reproduced. However, in case where the processing time is limited, the arrangement may be changed to begin the processes of the steps 704 to 710 immediately after completion of reproduction of the data CHa and to begin the processes of the steps 714 to 720 immediately after completion of reproduction of the data CHb.

In case that the recorded data is found to have an error incapable of correction by the verifying process which is carried out immediately after recording, the same data is arranged to be repeatedly recorded. The arrangement ensures highly reliable data recording without stopping the drum 50 from rotating and the tape T from travelling. Therefore, data can be recorded one after another for reliable data recording within a short period of time.

In case where only one of the reproduced data CHa or CHb has an error incapable of correction, the recorder is arranged to record again only the data that has the error incapable of correction. This allows the data rate to be set as high as possible at the time of recording, so that the data recording time can be further shortened.

Figure 22:
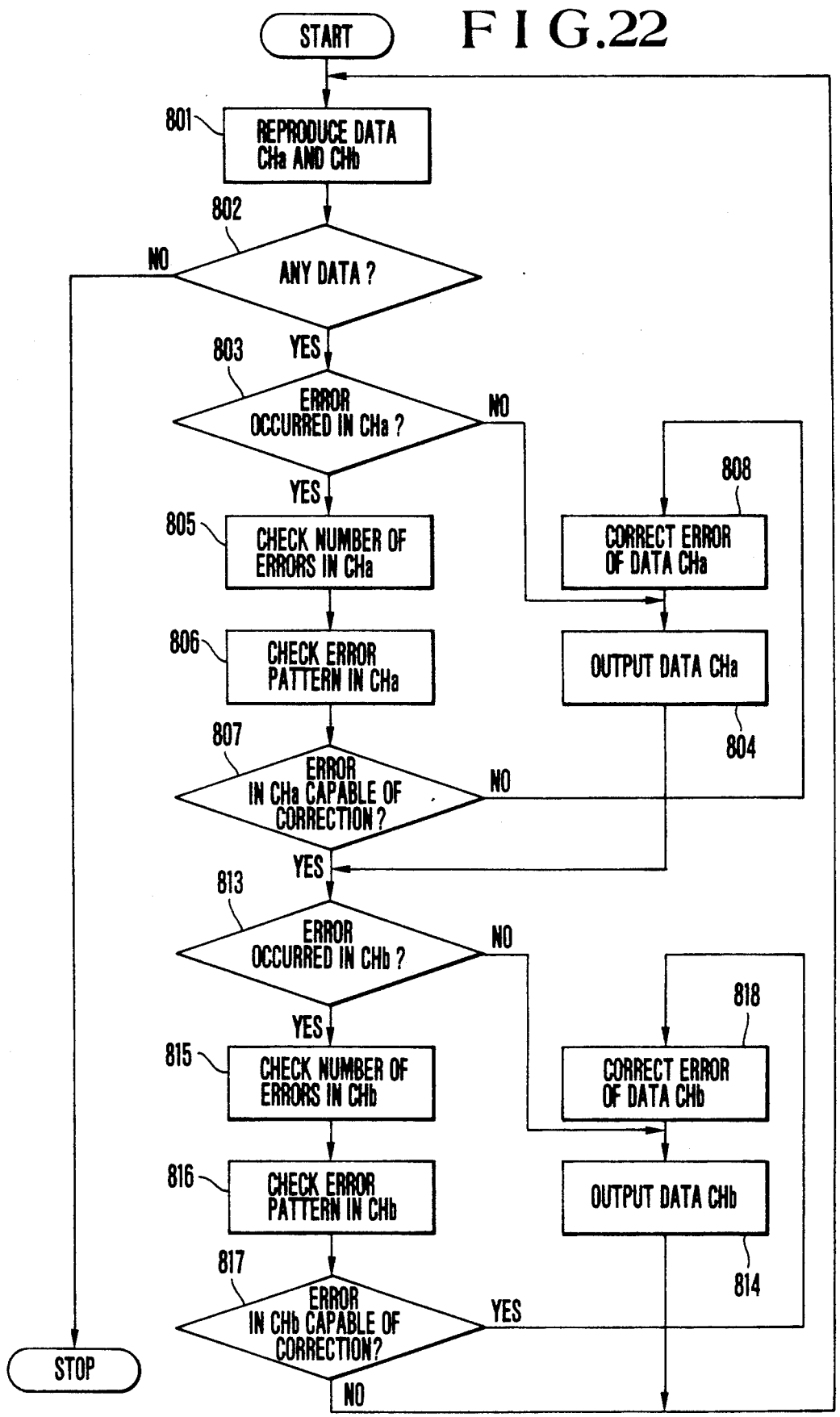
FIG. 22 is a flow chart showing the reproducing operation of the recorder of FIG. 18.

Referring now to FIG. 22 which is a flow chart, the data recorder performs a reproducing operation in the following manner:

At a step 801: The reproducing heads HA' and HB' begin to reproduce. At a step 802: A check is made for the presence or absence of any data record. If any data record is found, the flow proceeds to a step 803. At the step 803: The output of the error detecting circuit 23a is checked for occurrence of any data error in data CHa. If no data error is found, the flow comes to a step 804. At the step 804: The PCM processor 25a performs a deinterleaving action on the data CHa before the data CHa is produced. The data CHa is then written into the field memory 27 in accordance with given addresses according to the ID data reproduced. In the event of occurrence of some data error in the data CHa, the flow comes to a step 805 to find the number of error occurrences on the basis of the result of detection made by the error detecting circuit 23a. The flow then comes to a step 806 to find an error occurring pattern. At a step 807: Each error of the data CHa is checked to see if it is capable of correction or not. If it is found to be capable of correction, the flow comes to a step 808 to correct the error of the data CHa. The flow then comes to the step 804 to deinterleave the data CHa before it is produced. If the error of the reproduced data CHa is found to be incapable of correction, the flow proceeds to a step 813 without outputting the reproduced data on the assumption that the same data as the reproduced data is also recorded in a next track. At steps 813 to 818: The data CHb is processed in the same manner as the manner in which the data CHa has been processed through the steps 803 to 808. After completion of this processing operation, the flow comes back to the step 801. It goes without saying that the length of time from the end of the step 801 to the return of the flow to the step 801 is arranged to be within the period of time during which the drum 50 turns around $(180-\theta)$ degrees.

In the data recorder described, the reproducing heads are arranged to serve also as verifying heads. In addition to that, the error detecting circuit 23 is arranged to be usable both for recording and for reproduction. This arrangement permits simplification in the structural arrangement of the data recording and reproducing apparatus. Further, during reproduction, only highly reliable data is allowed to be written into the field memory 27. Therefore, still image data which is obtained by repeatedly reading stored data out from the field memory 27 has a very high degree of reliability.

Further, the number of areas to be simultaneously used for recording is arranged to be two in the case of the embodiment described. However, the number of simultaneous recording areas may be changed to three or more with three or more signal processing circuits arranged accordingly.

What is claimed is:

1. A data recording apparatus comprising:
    (a) a cylindrical member for guiding a tape-shaped recording medium, the cylindrical member having a first rotary head arranged to periodically trace said tape-shaped recording medium to form oblique tracks one after another on said recording medium and a second rotary head arranged to trace said recording medium following a tracing locus of said first rotary head, said first rotary head and said second rotary head being at angular positions with respect to each other so that said second rotary head does not trace said oblique tracks during a period when said first rotary head is forming said oblique tracks;
    (b) recording processing means arranged to convert digital data into recording data suited for recording and to supply said recording data for one oblique track to said first rotary head, during a predetermined period in every rotation of said first rotary head;
    (c) error detecting means for detecting code errors of data reproduced by said second rotary head from an oblique track previously formed on said recording medium;
    (d) discriminating means for discriminating whether the code errors are correctable or not, said discriminating means being operable during a period from a time at which said second rotary head finishes tracing said oblique tracks to a time at which said first rotary head starts to trace said oblique tracks; and
(e) rerecording means arranged to control said rerecording processing means on the basis of the result of discrimination made by said discriminating means for rerecording data recorded in the oblique track.

2. An apparatus according to claim 1 wherein said recording processing means includes means for adding an error correction code to said digital data, and wherein said discriminating means discriminates for every track whether or not all of the code errors detected by said error detecting means are capable of correction by said error correction code.

3. An apparatus according to claim 1, wherein a track width of said second rotary head is arranged to be narrower than that of said first rotary head.

4. An apparatus according to claim 1, further comprising reproduction processing means for restoring said digital data by using data reproduced from said recording medium by said second rotary head.

5. An apparatus according to claim 4, wherein said reproduction processing means is arranged to restore said digital data without using a signal reproduced by said first rotary head.

6. An apparatus according to claim 4, wherein said reproduction processing means is arranged to restore said digital data by using signals reproduced by said first and second rotary heads.

7. An apparatus according to claim 1, further comprising a third rotary head arranged to trace said tape-shaped recording medium alternately with said first rotary head to form oblique tracks one after another, and a fourth rotary head arranged to trace said tape-shaped recording medium following a tracking locus of said third rotary head, and wherein said first, second, third, and fourth rotary heads are arranged at angular positions with respect to each other so that said second rotary head and said fourth rotary head do not trace said oblique tracks during a period when said first rotary head or said third rotary head is forming said oblique tracks.

8. An apparatus according to claim 1, wherein said discriminating means further discriminates whether code errors of data reproduced by said fourth rotary head are correctable or not, and is operable during a period from a time at which said fourth rotary head finishes tracing said oblique tracks to a time at which said third rotary head starts to trace said oblique tracks.

9. A data recording apparatus comprising:
(a) a cylindrical member for guiding a tape-shaped recording medium, the cylindrical member having a first rotary head arranged to periodically trace said tape-shaped recording medium to form oblique tracks one after another on said recording medium and a second rotary head arranged to trace said recording medium following a tracing locus of said first rotary head, said first rotary head having an angular position which is proceeded by a predetermined angle $\phi$ from the angular position of said second rotary head, said predetermined angle being larger than an angle $\phi$ of rotation of said first rotary head while said first rotary head forms one of said oblique tracks and smaller than $(360-\theta)$;
(b) recording processing means arranged to convert digital data into recording data suited for recording and to supply said recording data for one oblique track to said first rotary head, during a predetermined period in every rotation of said first rotary head;
(c) error detecting means for detecting a code error of data reproduced by said second rotary head from an oblique track previously formed on said recording medium;
(d) discriminating means for discriminating whether the code errors are correctable or not, said discriminating means being operable during a period from a time at which said second rotary head finishes tracing said oblique tracks to a time at which said first rotary head starts to trace said oblique tracks; and
(e) rerecording means arranged to control said rerecording processing means on the basis of the result of discrimination made by said discriminating means for rerecording data recorded in the oblique track.

10. An apparatus according to claim 9, further comprising a third rotary head arranged to trace said tape-shaped recording medium alternately with said first rotary head to form oblique tracks one after another, and a fourth rotary head arranged to trace said tape-shaped recording medium following a tracking locus of said third rotary head, and wherein said third rotary head has an angular position which is proceeded by a predetermined angle $\phi$ from the angular position of said fourth rotary head, said predetermined angle $\phi$ being larger than $\theta$ and smaller than $(180-\theta)$.

11. An apparatus according to claim 10, wherein said discriminating means further discriminates whether code errors of data reproduced by said fourth rotary head are correctable or not, and is operable during a period from a time at which said fourth rotary head finishes tracing said oblique tracks to a time at which said third rotary head starts to trace said oblique tracks.

* * * * *